United States Patent
Dispensa et al.

(10) Patent No.: US 7,062,259 B1
(45) Date of Patent: Jun. 13, 2006

(54) CONFIGURATION OF WIRELESS CONTROL SYSTEMS FOR BROADBAND WIRELESS COMMUNICATIONS

(75) Inventors: Steve Dispensa, Leawood, KS (US); Jamie T. Kail, Lenexa, KS (US); David S. McGinniss, Naperville, IL (US)

(73) Assignee: Sprint Communications Company L.P., Overland Park, KS (US)

( * ) Notice: Subject to any disclaimer, the term of this patent is extended or adjusted under 35 U.S.C. 154(b) by 392 days.

(21) Appl. No.: 10/370,754

(22) Filed: Feb. 20, 2003

(51) Int. Cl.
*H04M 3/00* (2006.01)

(52) U.S. Cl. ................ 455/418; 455/412.1; 455/414.1; 370/351; 370/352; 709/221; 709/229

(58) Field of Classification Search ........... 455/418, 455/412.1, 412.2, 550.1, 552.1, 414.1; 709/218, 709/230, 229, 221; 370/351, 352, 468, 395.52
See application file for complete search history.

(56) References Cited

U.S. PATENT DOCUMENTS

| | | | |
|---|---|---|---|
| 2002/0004935 A1* | 1/2002 | Huotari et al. | 717/11 |
| 2002/0124182 A1* | 9/2002 | Basco et al. | 713/200 |
| 2002/0151270 A1* | 10/2002 | Johnston | 455/3.05 |
| 2002/0165626 A1* | 11/2002 | Hammons et al. | 700/53 |
| 2002/0178271 A1* | 11/2002 | Graham et al. | 709/229 |
| 2003/0033379 A1* | 2/2003 | Civanlar et al. | 709/218 |
| 2003/0069950 A1* | 4/2003 | Gieseke | 709/221 |
| 2003/0105839 A1* | 6/2003 | Ben | 709/220 |
| 2003/0223432 A1* | 12/2003 | Charania et al. | 370/395.52 |
| 2004/0105444 A1* | 6/2004 | Korotin et al. | 370/395.5 |
| 2005/0102300 A1* | 5/2005 | Madsen | 707/100 |

OTHER PUBLICATIONS

Dawson, Fred, "Broadband Wireless for Biz: Rumblings," Network Solutions, Xchange Magazine, Oct. 2000, pp. 52-66.
Veritas, Veritas NerveCenter: Downstream Alarm Suppression, Veritas Software Corporation, 1998-1999, pp. 1-32.
Hybrid, Two-way MMDS: Today and Tomorrow, IoWave Inc (formely Hybrid Networks).
System Description Release 5.1, Series 2000, Hybrid.

* cited by examiner

*Primary Examiner*—Danh Cong Le

(57) ABSTRACT

A communication system is disclosed that is comprised of a plurality of communication markets. Each communication market comprises a wireless control system. Each of the wireless control systems is configured to retrieve a general configuration file and a custom parameter file. The custom parameter file is customized for a geographic region. Each of the wireless control systems is configured to process the general configuration file and a custom parameter file to configure itself with a custom configuration. Each of the wireless control systems is then configured to control broadband wireless communications based on the custom configuration.

20 Claims, 8 Drawing Sheets

CONFIGURATION OF WIRELESS CONTROL SYSTEMS FOR BROADBAND WIRELESS COMMUNICATIONS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a method and system for configuring wireless control systems for broadband wireless communications.

2. Description of the Prior Art

People and businesses are demanding higher bandwidths from their communication providers. Consequently, the communication providers are looking for ways to increase the bandwidth of their systems using broadband technologies. Broadband technologies are generally referred to as systems that deliver a bandwidth at or above 64 kbps. Broadband technologies can communicate over downstream channels and upstream channels. The customer receives data from another device or system over the downstream channels. The customer transmits data to another device or system over the upstream channels.

Broadband Wireline Systems

One example of a broadband technology is Digital Subscriber Line (DSL) service. DSL service can carry both voice signals and data signals at the same time in both directions. DSL service also can carry call information and customer data. DSL service is typically comprised of twisted-pair wires that connect a customer to a central office. The central office comprises a Digital Subscriber Line Access Multiplexer (DSLAM) that provides the DSL service to the customer. Unfortunately, the speed of DSL service is limited by the distance between the customer and the DSLAM. Customers located too far from the DSLAM may not be able to receive high-speed service. Also, there may not be enough customers within a particular area to make it economical to install a DSLAM. The quality of DSL service is also limited by the quality of the copper wire that connects the customer to the DSLAM. Furthermore, DSL service does not work over Digital Loop Carrier (DLC) lines.

Another broadband technology is cable modem service. The cable modem communicates with a device over a coaxial cable. The coaxial cable is typically the same coaxial cable used to receive cable television. The cable modem service can be one-way or two-way. In a two-way system, the coaxial cable carries both the upstream channels and the downstream channels. In a one-way system, the cable modem receives data on the downstream channels over the coaxial cable and transmits data on the upstream channels over a phone line. Unfortunately, the cable modem uses up valuable bandwidth on the phone line in the one-way system. Also, the upstream bandwidth is small over a phone line.

Broadband Wireless Systems

Another broadband technology is broadband wireless service. Customers that subscribe to broadband wireless service communicate with a head end. In a one-way wireless system, a transmitter antenna for the head end broadcasts wireless signals to the customer on the downstream channels. The transmitter antenna is a satellite antenna or a land-based antenna. The customer transmits data to the head end over another medium, such as a phone line or a cable modem, on the upstream channels. One example of a one-way wireless system is a Digital Satellite System (DSS) from DIRECTV.

A specific type of broadband wireless system communicates over Multichannel Multipoint Distribution Service (MMDS) frequencies and Multipoint Distribution Service (MDS) frequencies. The MMDS frequencies range from 2500 MHz to 2686 MHz. The MDS frequencies range from 2150 MHz to 2162 MHz. In a typical MMDS system, the bandwidth of the upstream channels is about 6 MHz. The upstream bandwidth is divided into subchannels. Each subchannel has a bandwidth of 200 kHz. In other examples, each subchannel has a bandwidth of 166 KHz.

A head end manages the upstream and downstream channels with the customer. The head end also interfaces the customer with communication networks such as the Internet. The head end includes a base antenna comprised of a transmitter antenna and one or more receiver antennas. MMDS requires a line of sight between devices that are communicating. Therefore, the antennas are placed on a high building or a mountain to establish lines of sight with the customers.

The transmitter antenna is omni-directional and broadcasts data from the head end to the customers on the downstream channels. In a two-way wireless system, the receiver antennas are positioned to receive MMDS signals transmitted from customers to the head end on the upstream channels. Each receiver antenna is positioned to receive MMDS signals from customers located within a certain area. The areas formed by the antennas are referred to as sectors. The sectors have designated frequency ranges or designated channels.

The head end is comprised of an upstream manager and a downstream manager that control transmissions on the upstream channels and the downstream channels, respectively. As stated above, the upstream channels and the downstream channels are divided into subchannels. One upstream subchannel is a contention channel reserved for signaling, while the remaining subchannels are bearer channels.

In the broadband wireless system, a wireless broadband router is located at a customer premises. The wireless broadband router communicates with the upstream manager and the downstream manager to exchange data. The upstream manager generally operates the channels and/or subchannels in four states: idle, contention, polling, and dedicated. In the idle state, the channels are idle. In the contention state, the upstream manager generates and transmits control signals over one or more subchannels.

For the polling and dedicated states, the upstream manager polls numerous wireless broadband routers to allocate use of the subchannels. Polling is a round robin process to determine which wireless broadband router has access to a subchannel. The upstream manager maintains a queue of the active wireless broadband routers to determine which wireless broadband router is next to transmit over a subchannel for a period of time. The upstream manager keeps an inventory of open subchannels and waiting wireless broadband routers in the queue.

Configuration of Control Systems for Broadband Wireless Communication

As stated above, the upstream manager and the downstream manager control transmissions over the upstream channels and the downstream channels. The upstream manager and the downstream manager each communicate with a market system manager. The market system manager controls the operation of the upstream manager and the downstream manager by sending control information. The configuration of the market system manager thus determines the operation of the broadband wireless system and the broadband wireless communications within the broadband wireless system. Each market system manager is initially configured before being put into service. A system administrator manually configures each market system manager using a configuration program.

One example of a market system manager is a Cyber-Manager 2000 from Hybrid Networks, Inc. Before a Cyber-Manager is put into service, a system administrator initially configures the CyberManager. To initially configure the CyberManager, the system administrator accesses a graphical configuration program called "CM configure". The configuration program has blank or variable fields that have to be filled in for the program to run. The system administrator manually enters configuration parameters into the blank or variable fields. The configuration program then generates a configuration file called "hms.config". The CyberManager executes the configuration file to generate the control information and control the operation of the broadband wireless system. The above process is repeated for each CyberManager before they are put into service.

The system administrator can also alter the configuration of the market system manager to optimize performance of the broadband wireless system. To reconfigure the Cyber-Manager for example, the system administrator again accesses the configuration program. The system administrator manually enters different configuration parameters into the blank or variable fields to alter the configuration. The configuration program again generates the configuration file called "hms.config". The CyberManager executes the configuration file to generate the control information and control the operation of the broadband wireless system.

Unfortunately, manual configuration of market system managers is inefficient, such as is the case with the Cyber-Manager. If multiple market system managers are being put into service, then each market system manager has to be manually configured. Also, configuration of the market system managers requires a highly-trained system administrator. Thus, inefficient methods of configuring the market system manager by a highly-trained system administrator can prove to be expensive.

SUMMARY OF THE INVENTION

The invention helps to solve the above problems by configuring wireless control systems using a general configuration file while customizing the configuration with custom parameter files. The general configuration file and the custom parameter files advantageously reduce the time needed to configure the wireless control systems. The general configuration file and the custom parameter files also reduce the need for highly-trained system administrators to configure the wireless control systems.

In one embodiment of the invention, a communication system is comprised of a plurality of communication markets. Examples of communication markets are geographic regions, including cities such as Phoenix, Denver, and Kansas City. Each communication market comprises a wireless control system. The wireless control systems are configured to retrieve a general configuration file. A general configuration file is a file that can be used by any or all of the wireless control systems to configure the wireless control systems. Each of the wireless control systems is configured to retrieve a custom parameter file. A custom parameter file is any file that includes parameters for broadband wireless communications that are tailored for a specific geographic region. Each of the wireless control systems is configured to process the general configuration file and the custom parameter file to configure itself with a custom configuration. Each of the wireless control systems is configured to control broadband wireless communications based on the custom configuration.

In another embodiment of the invention, the wireless control systems are configured to communicate with an operations center. The operations center is configured to generate the general configuration file and transfer the general configuration file to the wireless control systems. The operations center is also configured to generate the custom parameter files and transfer a custom parameter file to each of the wireless control systems.

A particular reference number in one figure refers to the same element in all of the other figures.

DETAILED DESCRIPTION OF THE INVENTION

Broadband Wireless System—FIGS. 1–6

FIGS. 1–6 depict a specific example of a broadband wireless system in accord with the present inventions. Those skilled in the art will appreciate numerous variations from this example that do not depart from the scope of the inventions. Those skilled in the art will also appreciate that various features described below could be combined with other embodiments to form multiple variations of the inventions. Those skilled in the art will appreciate that some conventional aspects of FIGS. 1–6 have been simplified or omitted for clarity.

Figure 1:
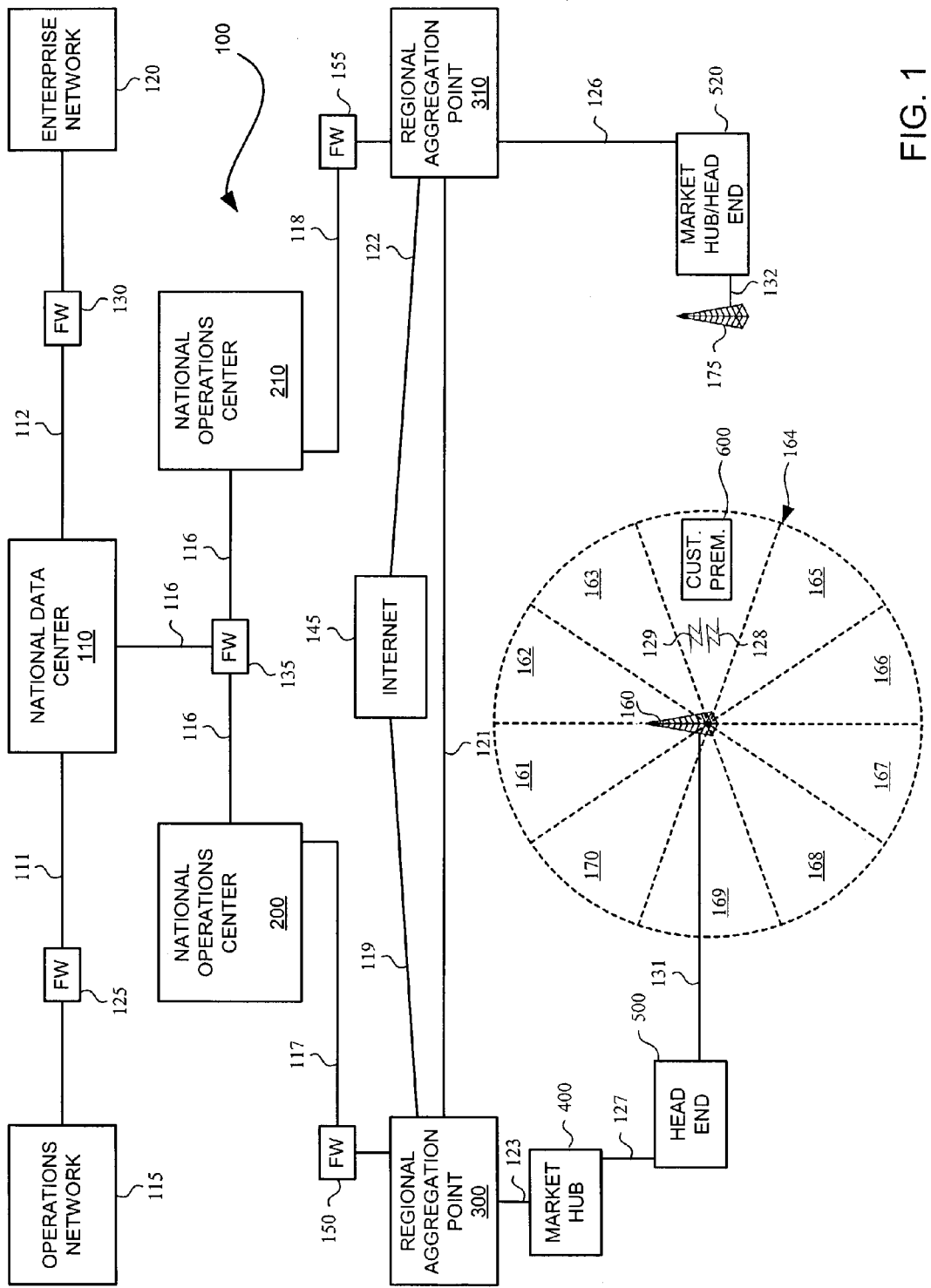
FIG. 1 is a block diagram of a broadband wireless system in an example of the invention.

FIG. 1 is a block diagram that illustrates a broadband wireless system 100 in an example of the invention. The broadband wireless system 100 is comprised of a national data center 110, an operations network 115, an enterprise network 120, a national operations center 200, a national operations center 210, an Internet 145, a regional aggregation point 300, a regional aggregation point 310, a market hub 400, a head end 500, a base antenna 160, a market hub/head end 520, a base antenna 175, and a customer premises 600.

The national data center 110 is configured to compile and display network information for the broadband wireless system 100. Network information is data that can be evaluated to operate a communication network, including performance information, fault information, billing information, and customer information.

The national data center 110 is comprised of systems that help to manage the broadband wireless system 100. Some of the systems are as follows. A national performance management system is configured to collect and store performance information for the broadband wireless system 100. The operation of a national performance management system is further discussed in FIG. 2. A national FTP server is configured to transfer large files based on File Transfer Protocol. A national RADIUS server is configured to handle user-logins and security for the national data center 110. A national Domain Naming System (DNS) server is configured to translate the domain names of host computers to IP addresses. A billing system running Portal Software is configured to generate billing records for users of the broadband wireless system 100. A network management system from Visual Networks is configured to provide a service level management and reporting service. A customer service server running Primus software from Primus Knowledge Solutions is configured to collect and process customer and product information. An ISA proxy server is configured to provide a firewall to users accessing the national data center 110. A fault detection system from Cable Master, Inc. is configured to detect and locate faults on the broadband wireless system 100. A fault management system running NetCool from Micromuse, Inc. is configured to collect and process fault information for the broadband wireless system 100. A fault reporting system from Vantive Corp is configured to provide detailed information on faults occurring on the broadband wireless system 100.

The operations network 115 is configured to process billing information, customer information, product ordering information, and other information generated from the broadband wireless system 100. The enterprise network 120 is an internal employee network configured to provide certain employees access to the network information for the broadband wireless system 100.

The national operations center 200 is configured to route data within the broadband wireless system 100, collect network information for the broadband wireless system 100, and store the network information. The national operations center 200 is discussed in further detail in FIG. 2. The regional aggregation point 300 is configured to route data within the broadband wireless system 100, collect network information for the broadband wireless system 100, and store the network information. The regional aggregation point 300 is discussed in further detail in FIG. 3. The market hub 400 is configured to route data within the broadband wireless system 100, collect network information for the broadband wireless system 100, and store the network information. The market hub 400 is discussed in further detail in FIG. 4. The head end 500 is configured to communicate with a customer premises over a wireless link using the base antenna 160 and collect network information.

Figure 5:
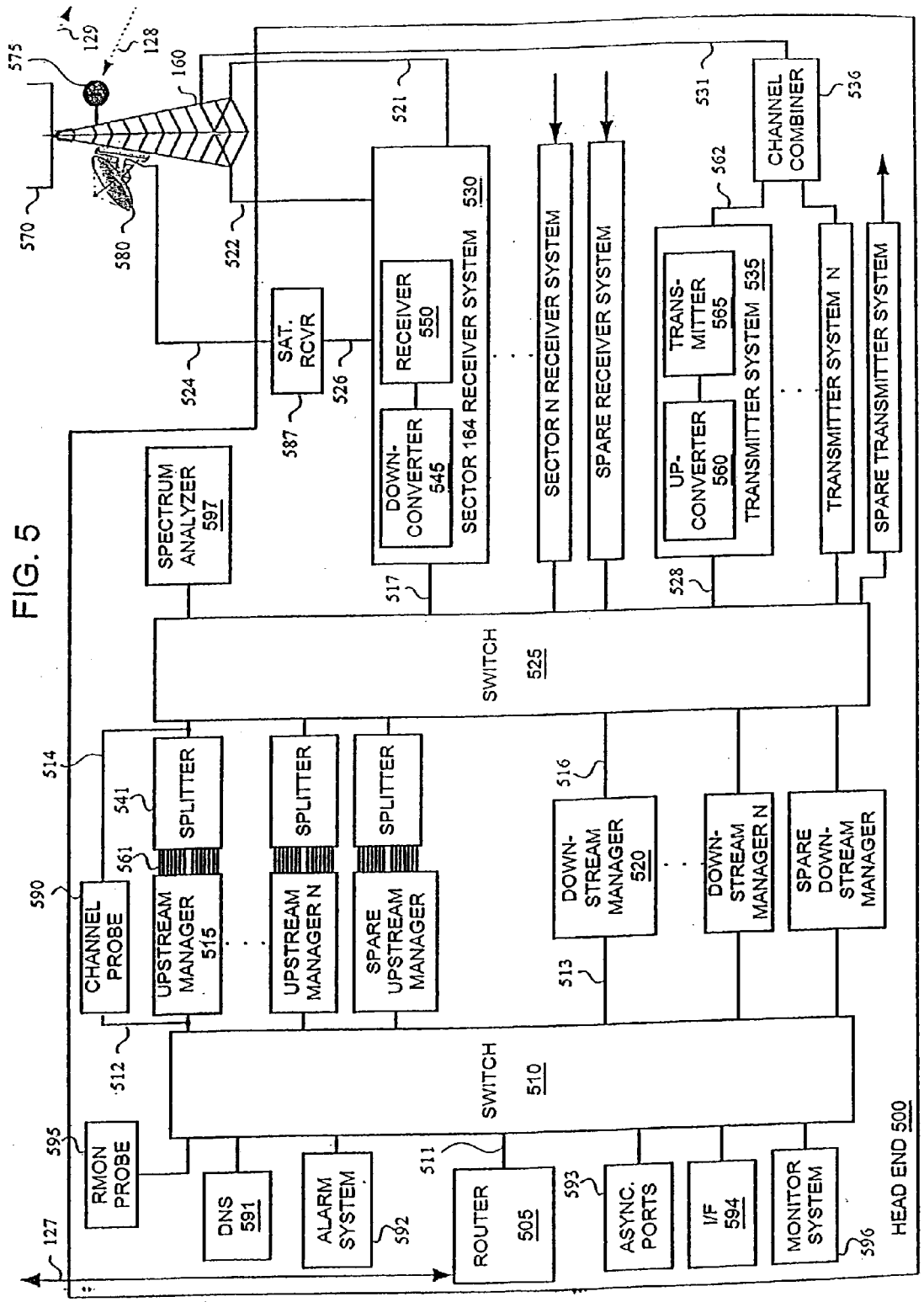
FIG. 5 is a block diagram of a head end in an example of the invention.

The head end 500 is discussed in further detail in FIG. 5. The customer premises 600 is configured to communicate with the head end 500 over a wireless link. The customer premises 600 is discussed in further detail in FIG. 6.

The broadband wireless system 100 could include secondary data centers (not shown) that correspond with the national operation centers 200 and 210. The secondary data centers could be comprised of the following systems. A national performance management system that is configured to collect and store performance information for the broadband wireless system 100. The operation of a national performance management system is further discussed in FIG. 2. A national FTP test server that is configured to test the transfer of large files based on File Transfer Protocol. A national RADIUS server that is configured to handle user-logins and security for the secondary data center. A national DNS server that is configured to translate the names of host computers to addresses. The base antenna 160 forms ten sectors 161–170. The customer premises 600 is located in the sector 164.

The following table describes how the components in FIG. 1 are connected. The first and second columns describe the components and the third column describes the link that connects the components.

| Component | Component | Link |
| --- | --- | --- |
| National data center 110 | Operations network 115 | 111 |
| National data center 110 | Enterprise network 120 | 112 |
| National data center 110 | National operations center 200 | 116 |
| National data center 110 | National operations center 210 | 116 |
| National operations center 200 | National operations center 210 | 116 |
| National operations center 200 | Regional aggregation point 300 | 117 |
| National operations center 210 | Regional aggregation point 310 | 118 |
| Regional aggregation point 300 | Internet 145 | 119 |
| Regional aggregation point 300 | Regional aggregation point 310 | 121 |
| Regional aggregation point 310 | Internet 145 | 122 |
| Regional aggregation point 300 | Market hub 400 | 123 |
| Regional aggregation point 310 | Market hub / Head end 520 | 126 |
| Market hub 400 | Head end 500 | 127 |
| Head end 500 | Base antenna 160 | 131 |
| Base Antenna 160 | Customer premises 600 | 128–29 |
| Market hub / Head end 520 | Base antenna 175 | 132 |

The links 111–112 and 116–118 include firewalls (FW) 125, 130, 135, 150, and 155, respectively. A firewall is a system, hardware or software, configured to limit access to a system or network. The links 111–112, 116–119, 121–123, and 126–127 are DS-3 connections. Those skilled in the art will appreciate that the links 111–112, 116–119, 121–123, and 126–127 could be any type of electrical or optical connection including T-1, T-3, OC-3, OC-12, or OC-48 connections. Those skilled in the art will appreciate that the links 111–112, 116–119, 121–123, and/or 126–127 could include redundant connections to increase reliability of the links.

The broadband wireless system 100 operates as follows. The customer premises 600 communicates with systems within the Internet 145. For instance, the customer premises 600 could download a web page from a server in the Internet 145. To download the web page, the customer premises 600 accesses the server through the head end 500, the market hub 400, and the regional aggregation point 300.

The national operations centers 200 and 210 collect network information for the broadband wireless system 100. The national operations center 200 retrieves network information from the regional aggregation point 300, the market hub 400, the head end 500, and the customer premises 600. The national operations center 200 shares the network information with the national data center 110. Network information comprises performance information and fault information. The performance information is information that describes how a communication network is operating, such as throughput rates, number of transmission units, and signal-to-noise ratio. The fault information is information that identifies failures in a communication network, such as alarms and indicators of failed communication devices. The national operations center 200 processes and stores the network information. The national operations center 210 is a mirror system to the national operations center 200. The national operations center 210 retrieves and stores the same network information as the national operations center 200. Thus, if the national operations center 200 fails, then the national operations center 210 takes over without dramatically affecting the broadband wireless system 100.

The regional aggregation point 300 routes data through the broadband wireless system 100 and collects network information for the broadband wireless system 100. The regional aggregation point 300 retrieves network information from the market hub 400, the head end 500, and the customer premises 600. The regional aggregation point 300 stores the network information and shares the network information with the national operations center 200. The regional aggregation point 310 operates similar to the regional aggregation point 300.

The market hub 400 routes data from the head end 500 to the regional aggregation point 300 and vice-versa, and collects network information for the broadband wireless system 100. The market hub 400 retrieves network information from the head end 500 and the customer premises 600. The market hub 400 stores the network information and shares the network information with the regional aggregation point 300.

The head end 500 interfaces the customer premises 600 with other components in the broadband wireless system 100 and routes data from the customer premises 600 to the market hub 400 and vice-versa. The head end 500 communicates with the customer premises 600 through the base antenna 160. The head end 500 collects network information for the broadband wireless system 100. The head end 500 transfers the network information to the market hub 400, the regional aggregation point 300, and/or the national operations center 200. The market hub/head end 520 operates similar to the market hub 400 and the head end 500.

The customer premises 600 exchanges data with the head end 500 over the wireless links 128 and 129. The customer premises 600 has two-way wireless communication with the head end 500 because both the downstream and upstream channels are over the wireless links 128 and 129.

Figure 2:
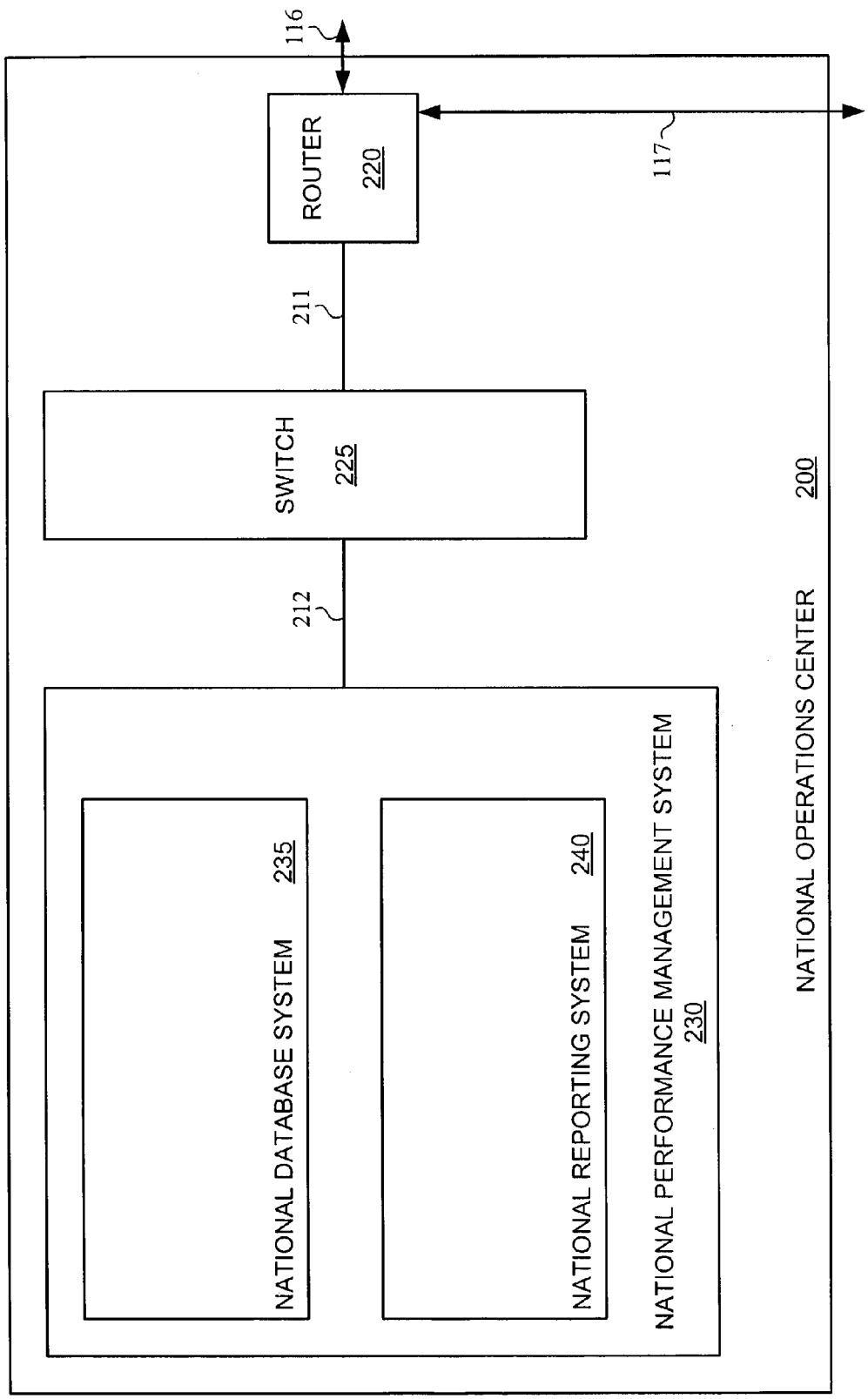
FIG. 2 is a block diagram of a national operations center in an example of the invention.

FIG. 2 is a block diagram that illustrates the national operations center 200 in an example of the invention. The national operations center 200 is comprised of a router 220, a switch 225, and a national performance management system 230. The national performance management system 230 is comprised of a national database system 235 and a national reporting system 240.

The national performance management system 230 is configured to collect, store, and report performance information for the broadband wireless system 100. The national database system 235 is configured to store performance information for the broadband wireless system 100. The national database system 235 is an Oracle database. The national reporting system 240 is configured to report the performance information for the broadband wireless system 100. The national reporting system 240 is an Apache web server.

The router 220 connects with the national data center 110 and the national operations center 210 over the link 116, and with the regional aggregation point 300 over the link 117. The router 220 connects with the switch 225 over a link 211. The link 211 is a Gigabit Ethernet connection. The switch 225 connects with the national performance management system 230 over a link 212.

In operation, the national performance management system 230 collects performance information from other components in the broadband wireless system 100. The national performance management system 230 communicates with the other components in the broadband wireless system 100 through the switch 225 and the router 220 to collect the performance information. The operation of the router 220 and the switch 225 is well known to those skilled in the art and is omitted for the sake of brevity. The national database system 235 stores the collected performance information. The national reporting system 240 retrieves the performance information from the national database system 235 and provides user-friendly formats of the performance information. Examples of the user-friendly formats are data files and HTML files. The national reporting system 240 provides other systems access to the performance information. For instance, a user system within the Internet 145 could access the national reporting system 240 and view the performance information using a web browser. Also, the national data center 110 could retrieve the performance information from the national reporting system 240 through a File Transfer Protocol (FTP) command and store the performance information.

Figure 3:
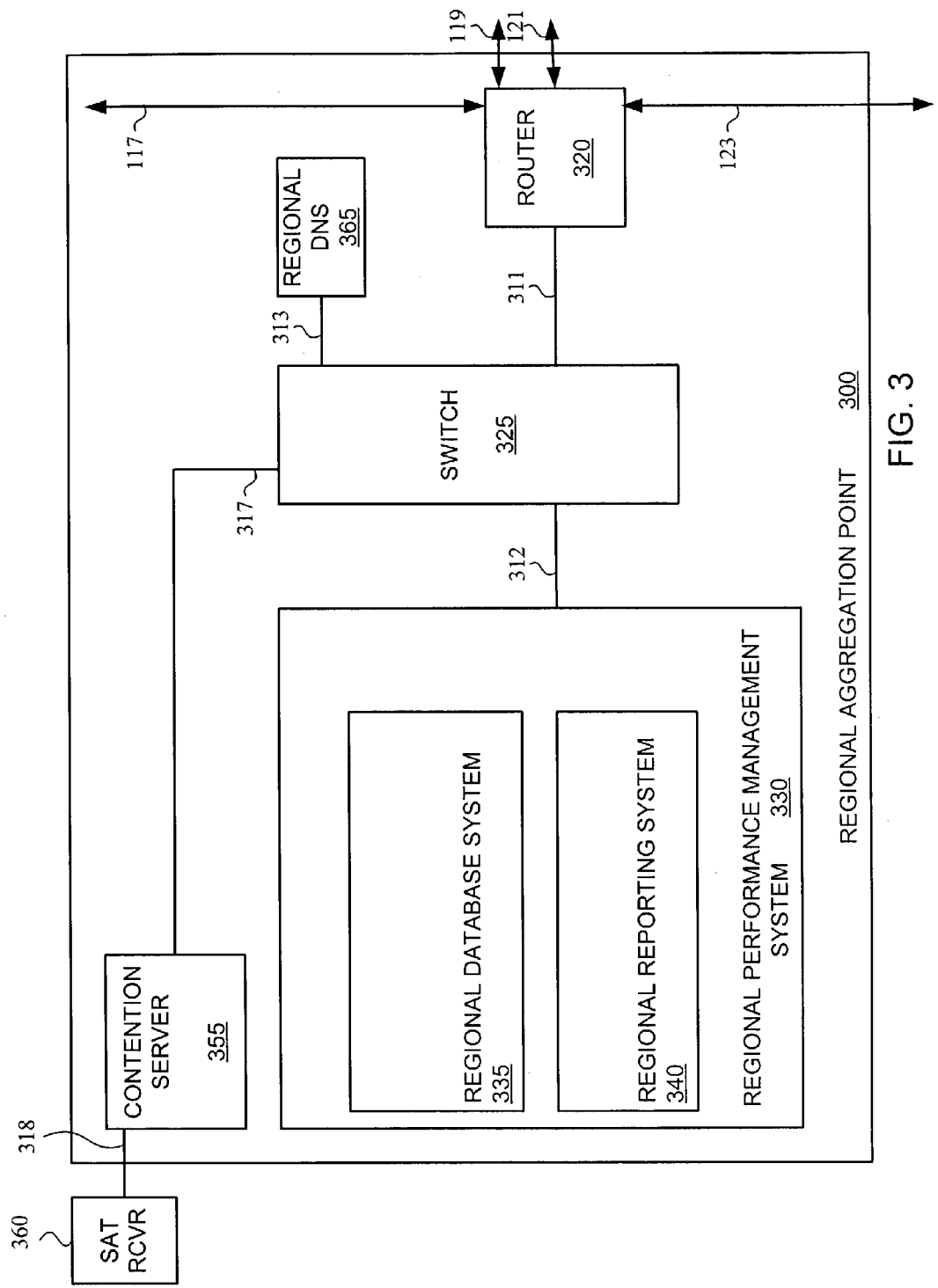
FIG. 3 is a block diagram of a regional aggregation point in an example of the invention.

FIG. 3 is a block diagram that illustrates the regional aggregation point 300 in an example of the invention. The regional aggregation point 300 is comprised of a router 320, a switch 325, a regional performance management system 330, a contention server 355, a satellite receiver 360, and a regional DNS server 365. The regional performance management system 330 is comprised of a regional database system 335 and a regional reporting system 340.

The router 320 is a GSR 12016 router from Cisco Systems. The switch 325 is a 6506 switch from Cisco Systems. The regional performance management system 330 is configured to collect, store, and report performance information for the broadband wireless system 100. The regional database system 335 is configured to store performance information for broadband wireless system 100. The regional database system 335 is an Oracle database. The regional reporting system 340 is configured to report performance information for the broadband wireless system 100. The regional reporting system 340 is an Apache web server. The contention server 355 and the satellite receiver 360 are from Cidera Co. The satellite receiver 360 is a Global Positioning System (GPS) receiver. The regional DNS server 365 is a Netra 1145 server from Sun Microsystems that is configured to translate the domain names of host computers to IP addresses.

The router 320 connects with the national operations center 200, the Internet 145, the regional aggregation point 310, and the market hub 400 over the links 117, 119, 121, and 123, respectively. The router 320 connects with the switch 325 over a link 311. The link 311 is a Gigabit Ethernet connection. The switch 325 connects with the regional performance management system 330 over a link 312. The switch 325 connects with the contention server 355 over a link 317. The contention server 355 connects with the satellite receiver 360 over a link 318. The link 318 is a coaxial cable. The switch 325 connects with the regional DNS server 365 over a link 313.

In operation, the regional performance management system 330 collects performance information for the broadband wireless system 100. The regional performance management system 330 communicates with other components in the broadband wireless system 100 through the switch 325 and the router 320 to collect the performance information. The operation of the router 320 and the switch 325 is well known to those skilled in the art and is not discussed for the sake of brevity. The regional database system 335 stores the collected performance information. The regional reporting system 340 retrieves the performance information from the regional database system 335 and provides user-friendly formats of the performance information. Examples of the user-friendly formats are data files and HTML files. The regional reporting system 340 provides other systems access to the performance information. For instance, a user system within the Internet 145 could access the regional reporting system 340 and view the performance information using a web browser. Also, the national performance management system 230 could retrieve the performance information from the regional reporting system 340 for storage in the national database system 235.

The contention server 355 receives configuration information from a content delivery network through the satellite receiver 360. The configuration information is used to pre-configure the regional performance management system 330. The configuration information is also used to update or re-configure the regional performance management system 330.

Figure 4:
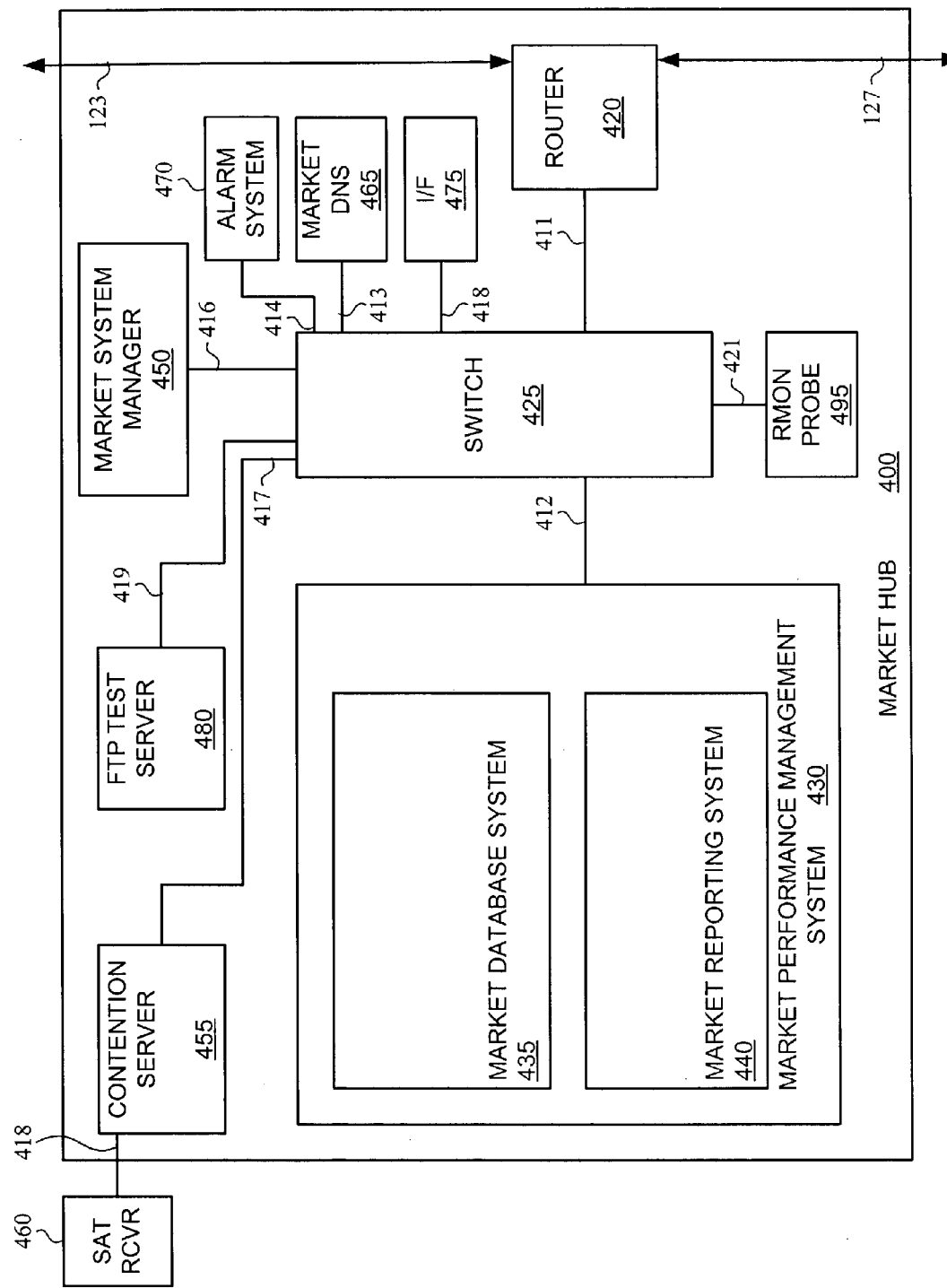
FIG. 4 is a block diagram of a market hub in an example of the invention.

FIG. 4 is a block diagram that illustrates the market hub 400 in an example of the invention. The market hub 400 is comprised of a router 420, a switch 425, a market performance management system 430, a market system manager 450, a contention server 455, a satellite receiver 460, a market DNS server 465, an alarm system 470, an interface 475, an FTP test server 480, and an RMON probe 495. The market performance management system 430 comprises a market database system 435 and a market reporting system 440.

The router 420 is a 7507 router from Cisco Systems. The switch 425 is a 6506 switch from Cisco Systems. The market performance management system 430 is configured to collect, store, and report performance information for the broadband wireless system 100. The market database system 435 is configured to store performance information for the broadband wireless system 100. The market database system 435 is an Oracle database. The market reporting system 440 is configured to report performance information for the broadband wireless system 100. The market reporting system 440 is an Apache web server. The market system manager 450 is a CyberManager 2000 (CMG-2000) from Hybrid Networks, Inc. The contention server 455 and the satellite receiver 460 are from Cidera Co. The satellite receiver 460 is a Global Positioning System (GPS) receiver. The market DNS server 465 is a Netra 1145 server from Sun Microsystems that is configured to translate the names of host computers to addresses. The alarm system 470 is an AlScout system from Applied Innovations, Inc. that is configured to monitor the broadband wireless system 100. The interface 475 is a Cybex interface configured to provide a computer interface to upstream and downstream managers in the head end 500. The upstream and downstream managers will be discussed further in FIG. 5. The FTP test server 480 is configured to test large file transfers based on File Transfer Protocol. The RMON probe 495 is a NetScout probe from NetScout Systems, Inc. that is configured to capture and define traffic information passing through a given point using RMON standards.

The router 420 connects with the regional aggregation point 300 and the head end 500 over the links 123 and 127, respectively. The router 420 connects with the switch 425 over a link 411. The link 411 is a Gigabit Ethernet connection. The switch 425 connects with the market performance management system 430 over a link 412. The switch 425 connects with the market system manager 450 over a link 416. The switch 425 connects with the contention server 455 over a link 417. The contention server 455 connects with the satellite receiver 460 over a link 418. The link 418 is a coaxial cable. The switch 425 connects with the market DNS server 465 over a link 413. The switch 425 connects with the alarm system 470 over a link 414. The switch 425 connects with the interface 475 over a link 418. The switch 425 connects with the FTP test server 480 over a link 419. The switch 425 connects with the RMON probe 495 over a link 421.

In operation, the market performance management system 430 collects performance information for the broadband wireless system 100. The market performance management system 430 communicates with other components in the broadband wireless system 100 through the switch 425 and the router 420 to collect the performance information. The operation of the router 420 and the switch 425 is well known to those skilled in the art and is not discussed for the sake of brevity. The market database system 435 stores the collected performance information. The market reporting system 440 retrieves the performance information from the market database system 435 and provides user-friendly formats of the performance information. Examples of the user-friendly formats are data files and HTML files. The market reporting system 440 provides other systems access to the performance information. For instance, a user system within Internet 145 could access the market reporting system 440 and view the performance information using a web browser. Also, the national performance management system 230 and/or the regional performance management system 330 could retrieve the performance information from the market reporting system 440 for storage in the national database system 235 and the regional database system 335, respectively.

The market system manager 450 monitors and stores routing information for upstream and downstream routing within the broadband wireless system 100. The market system manager 450 provides other systems access to the routing information.

The contention server 455 receives configuration information from a content delivery network through the satellite receiver 460. The configuration information is used to pre-configure the market performance management system 430 or the market system manager 450. The configuration information is also used to update or re-configure the market performance management system 430 or the market system manager 450.

FIG. 5 is a block diagram that illustrates the head end 500 in an example of the invention. The head end 500 is comprised of a router 505, a switch 510, an upstream manager 515, a splitter 541, a downstream manager 520, a switch 525, a spectrum analyzer 597, a receiver system 530, a transmitter system 535, a channel combiner 536, an Optical-to-Electrical (O/E) converter 585, a satellite receiver 587, the base antenna 160, a DNS server 591, an alarm system 592, asynchronous ports 593, an interface 594, and a monitor system 596. The receiver system 530 is comprised of a down-converter 545 and a receiver 550. The transmitter system 535 is comprised of an up-converter 560 and a transmitter 565. The base antenna 160 is comprised of a transmitter antenna 570, a receiver antenna 575, and a satellite antenna 580. The head end 500 also includes a channel probe 590 and an RMON probe 595.

Those skilled in the art will appreciate that the base antenna 160 could be positioned at a high altitude to improve communications. For instance, the base antenna 160 could be positioned on a mountain or a tall building. Consequently, the base antenna 160 could be placed at a remote location in relation to the head end 500. The base antenna 160 has a radial range of approximately 35 miles.

The router 505 is a 7507 router from Cisco Systems. The switch 510 is a 6506 switch from Cisco Systems. The upstream manager 515 is configured to manage data on upstream channels. The upstream manager 515 is a CyberMaster Upstream Router (CMU-2000-14C) from Hybrid Networks, Inc. The downstream manager 520 is configured to manage data on downstream channels. The downstream manager 520 is a CyberMaster Downstream Router (CMD-2000) from Hybrid Networks, Inc. The switch 525 is a 44 MHz Intermediate Frequency (IF) switch from PESA Switching Systems, Inc. The receiver system 530 is configured to receive a Radio Frequency (RF) signal and convert the RF signal into an IF signal. The receiver system 530 is a receiver from ADC Telecommunications Co. The transmitter system 535 is configured to receive an IF signal, convert the IF signal into a 6 MHz bandwidth RF signal, and transmit the 6 MHz bandwidth RF signal. The base antenna 160 is an antenna from Andrew Corp. The RMON probe 595 is a NetScout probe from NetScout Systems, Inc. that is configured to capture and define traffic information passing through a given point using RMON standards. The channel probe 590 is a Hybrid probe from Hybrid Networks, Inc. that is configured to monitor channel information for the upstream and downstream channels. The DNS server 591 is a Netra 1145 server from Sun Microsystems that is configured to translate the names of host computers to addresses. The alarm system 592 is an AlScout system from Applied Innovations, Inc. that is configured to monitor the broadband wireless system 100. The asynchronous ports 593 are Cisco 2620 asynchronous ports that are configured to provide access to the upstream manager 515 and the downstream manager 520. The interface 594 is a Cybex interface configured to provide a computer interface to the upstream manager 515 and the downstream manager 520. The monitor system 596 is a SCADA system that is configured to monitor the receiver system 530 and the transmitter system 535.

The spectrum analyzer 597 is a Hewlett-Packard HP8590 Spectrum Analyzer. With the spectrum analyzer 597 connected to the switch 525, the switch 525 can receive instructions to connect the spectrum analyzer 597 to various components in the head end 500. This allows a user to remotely control which spectrum of a component the user would like to analyze. To assist in analyzing the spectrum, iPanels for the HP859x may be used.

The router 505 connects with the market hub 400 over the link 127. The router 505 connects with the switch 510 over a link 511. The link 511 is a Gigabit Ethernet connection. The switch 510 connects with the upstream manager 515 over a link 512 and the downstream manager 520 over a link 513. The upstream manager 515 connects with the splitter 541 over links 561. The splitter 541 connects with the switch 525 over a link 514. The downstream manager 520 connects with the switch 525 over a link 516. The links 512–514, 516, and 561 are configured to transport Transmission Control Protocol/Internet Protocol (TCP/IP) packets.

The switch 525 connects with the receiver system 530 over a link 517. The link 517 is configured to transport an IF signal. The receiver system 530 connects with the receiver antenna 575 of the base antenna 160 over a link 521. The link 521 is a wire cable configured to transport an RF signal.

The receiver system 530 connects with the satellite receiver 587 over a link 526. The satellite receiver 587 connects with the satellite antenna 580 on the base antenna 160 over a link 524. The links 526 and 524 are coaxial cables. The receiver system 530 connects to the receiver antenna 575 on the base antenna 160 over a link 521.

The switch 525 connects with the transmitter system 535 over a link 528. The link 528 is configured to transport an IF signal. The transmitter system 535 connects with the channel combiner 536 over a link 562. The channel combiner 536 is also configured to connect with other transmitter systems. The channel combiner 536 connects with the transmitter antenna 570 on the base antenna 160 over a link 531. The link 531 is a wire cable configured to transport an RF signal. Those skilled in the art will appreciate that links 521, 522, 524, and 531 correspond to link 131 in FIG. 1.

The channel probe 590 connects to the links 512 and 514. The channel probe is configured to monitor channel information for the upstream and downstream channels. The RMON probe 595 connects to the switch 510. The RMON probe 595 is configured to capture and define traffic information passing through a given point using RMON standards.

The head end 500 operates as follows. The head end 500 communicates with the market hub 400 and the customer premises 600. The downstream manager 520 routes data to the customer premises 600. The data could be from other components in the broadband wireless system 100. The downstream manager 520 communicates with the other components through the switch 510 and the router 505. The operation of the router 505 and the switch 510 is well known to those skilled in the art and is not discussed for the sake of brevity. The head end 500 could also include a spare downstream manager in case of failure of one of the main downstream managers.

The downstream manager 520 receives packets that contain the data from the switch 510 over the link 513. The downstream manager 520 processes the packets to extract the data. The downstream manager 520 converts the data into an IF signal. The downstream manager 520 transmits the IF signal to the transmitter system 535 through the switch 525 over the links 516 and 528. The head end 500 could also include a spare transmitter system in case of failure of one of the main transmitter systems. The switch 525 switches between the multiple transmitter systems. The up-converter 560 and the transmitter 565 function together to process the IF signal and convert the IF signal into an RF signal having a bandwidth of 6 MHz. The channel combiner 536 combines the RF signals from the transmitter systems and transmits an RF signal to the transmitter antenna 570 over the link 531.

The transmitter antenna 570 is an omni-directional antenna. The transmitter antenna 570 transmits the RF signal to the customer premises 600 on the downstream channels over the link 129. The RF signal is a Multichannel Multipoint Distribution Service (MMDS) signal. The MMDS frequencies range from 2500 MHz to 2686 MHz. The MMDS signals in this example also include the Multipoint Distribution Service (MDS) frequencies. The MDS frequencies comprise MDS1 (2150–2156 MHz) and MDS2

(2156–2162 MHz). The bandwidth of the downstream channels is 6 MHz comprised of three 2 MHz subchannels, each with an approximate throughput of 9 Mbps.

Concurrently, the upstream manager 515 routes data, received from the customer premises 600, to the broadband wireless system 100. The upstream manager 515 communicates with other components in the broadband wireless system 100 through the switch 510 and the router 505.

The upstream manager 515 receives the data from the customer premises 600 through the receiver system 530 and the receiver antenna 575. The receiver antenna 575 is a directional antenna. The receiver antenna 575 forms the sector 164 shown in FIG. 1 based on the direction in which it points. Any communication device that communicates with the receiver antenna 575 is considered within the sector 164. Those skilled in the art will appreciate that the base antenna 160 could include a plurality of receiver antennas that form sectors 161–163 and 165–170. Those skilled in the art will also appreciate that the head end 500 could include a plurality of upstream managers depending on the number of sectors controlled by the head end 500. The head end 500 could also include a spare upstream manager in case of failure of one of the main upstream managers.

The receiver antenna 575 receives an RF signal from the customer premises 600 on the upstream channels over the link 128. The RF signal may be either an MDS signal or an MMDS signal. The bandwidth of the upstream channels is approximately 200 KHz with a throughput of approximately 256 Kbps.

The receiver antenna 575 transfers the RF signal over the link 521 to the receiver system 530. The receiver system 530 corresponds to the sector 164. The receiver 550 and the down-converter 545 function together to process the amplified RF signal and convert the amplified RF signal into an IF signal. The receiver system 530 transfers the IF signal to the splitter 541 through the switch 525 over the links 517 and 514. Those skilled in the art will appreciate that the head end 500 can include a plurality of receiver systems, wherein each receiver system corresponds to a sector. The head end 500 could also include a spare receiver system in case of failure of one of the main receiver systems. The switch 525 switches between multiple receiver systems and multiple upstream managers. For instance, if the head end 500 controls ten sectors, then the switch 525 would connect ten upstream managers to ten receiver systems.

The upstream manager 515 receives the IF signal from the splitter 541 over the links 561. The upstream manager 515 corresponds to the sector 164. The upstream manager 515 processes the IF signal to route the data carried by the IF signal. The upstream manager 515 generates packets and inserts the data, carried by the IF signal, into the packets. The upstream manager 515 transmits the packets to the switch 510 for transmission to other components in the broadband wireless system 100.

The upstream manager 515 also generates control messages for the customer premises 600. The upstream manager 515 transmits these control messages to the downstream manager 520 through the switch 510. The downstream manager 520 transmits the control messages to a wireless broadband router that is located in the customer premises 600. The wireless broadband router is further discussed in FIG. 6. The wireless broadband router communicates with the upstream manager and the downstream manager to exchange data.

The upstream manager 515 separates the upstream channels into subchannels. The upstream manager 515 manages a polling list of numerous wireless broadband routers in sectors 161–170 to allocate use of subchannels. Polling is a round robin process to determine which wireless broadband router has access to a subchannel. The upstream manager 515 maintains a queue of the active wireless broadband routers to determine which wireless broadband router is next to transmit over a subchannel for a period of time.

The upstream manager uses the control messages to grant a wireless broadband router use of a subchannel for a limited period of time. The control messages are credits. A credit is a message that allows usage of a subchannel for a period of time or for the transfer of a maximum number of transmission units such as bytes. One example of a credit includes information such as a subchannel or frequency range, a maximum allowed time to transfer data, and a maximum number of bytes the wireless broadband router is allowed to transfer.

There are two kinds of credits: polling and dedicated. Polling credits are credits related to polling of the wireless broadband routers. Polling credits are generally smaller than the dedicated credits. Once the wireless broadband router completes transfer of the packets, the wireless broadband router transmits a DONE message to the upstream manager 515 via the upstream channels. The DONE messages include information such as the number of bytes sent and the number of packets left for the wireless broadband router to transfer. If the DONE message shows that the wireless broadband router has more than three packets left to transfer and there are available subchannels, then the upstream manager 515 issues a dedicated credit to the wireless broadband router.

The receiver system 530 also receives a 10 MHz signal from the satellite receiver 587. The satellite antenna 580 receives satellite signals and transmits the satellite signals to the satellite receiver 587 over the link 524. The satellite receiver 587 processes the satellite signals to generate the 10 MHz signal. The satellite receiver 587 transmits the 10 MHz signal to the receiver system 530 over the link 526. The receiver system 530 uses the 10 MHz signal as a reference signal.

In some examples, the receiver system 530 communicates with the receiver antenna 575 over the links 522. In this example, the link 522 is a fiber optic cable. Depending on the number of receiver antennas on the base antenna 160, the number of wire cables, such as the link 521, running from the base antenna 160 could become large. A large number of wire cables can be heavy and can add stress to the structure of the base antenna 160. Fiber optic cable, on the other hand, can be lighter than wire cable. Therefore, it may be advantageous to run fiber optic cable between the base antenna 160 and the receiver system 530. In such a case, an optical to electrical converter 585 is used to convert the optical signal to an electrical signal.

Figure 6:
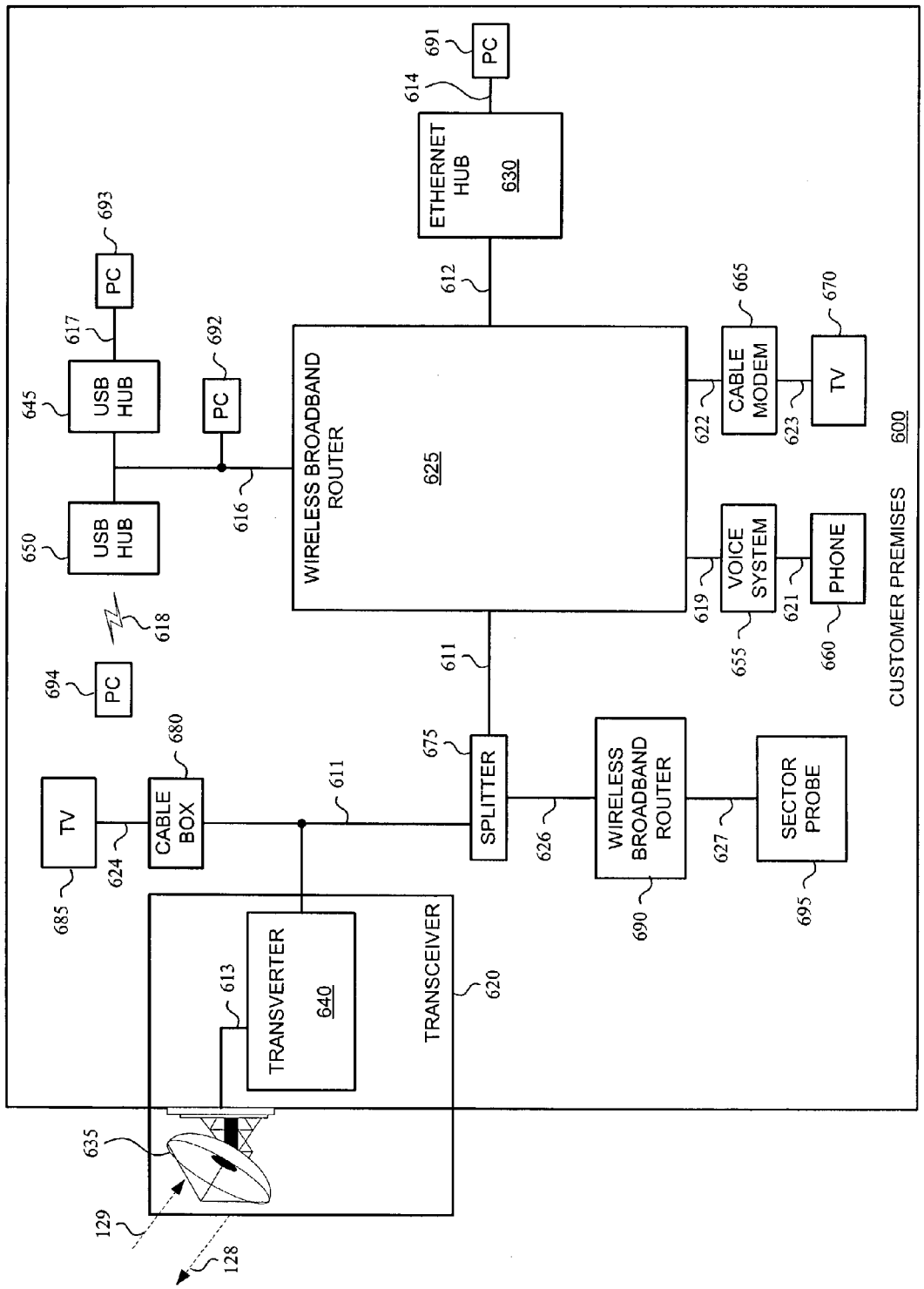
FIG. 6 is a block diagram of a customer premises in an example of the invention.

FIG. 6 is a block diagram that illustrates the customer premises 600 in an example of the invention. The customer premises 600 is comprised of a transceiver 620, a wireless broadband router 625, an Ethernet hub 630, and a computer (PC) 691. The transceiver 620 is comprised of a directional antenna 635 and a transverter 640. The customer premises 600 also includes a Universal Serial Bus (USB) hub 645, a USB hub 650, PCs 692–694, a voice system 655, a phone 660, a cable modem 665, a TV 670, a cable box 680, a TV 685, a splitter 675, a wireless broadband router 690, and a sector probe 695.

Examples of the customer premises 600 are residences or businesses. The transceiver 620 is configured to transmit and receive a wireless signal. The transceiver 620 is a transceiver from California Amplifier, Inc. The wireless broadband router 625 is configured to process packets to generate an IF signal, and vice-versa. The wireless broadband router 625 is a Series 2000 Wireless Broadband Router from Hybrid Networks, Inc. The Ethernet hub 630 is configured to interface multiple Ethernet connections. The Ethernet hub 630 is an Ethernet Hub from Netgear.

The USB hub 645 is a USB hub from Lucent Technologies. The USB hub 650 is an 802.11 wireless Ethernet standard hub from Lucent Technologies. The voice system 655 is configured to process voice data that is transmitted over packets. The splitter 675 is a 3 dB splitter. The wireless broadband router 690 is a Series 2000 Wireless Broadband Router from Hybrid Networks, Inc. The sector probe 695 is configured to collect performance information from the customer premises side.

The directional antenna 635 connects with the transverter 640 over a link 613. The link 613 is a coaxial cable. The transverter 640 connects with the wireless broadband router 625 over a link 611. The link 611 is an RG-59 coaxial cable. The wireless broadband router 625 connects with the Ethernet hub 630 over a link 612. The Ethernet hub 630 connects with the PC 691 over a link 614. The links 612 and 614 are Ethernet connections. Those skilled in the art will appreciate that the Ethernet hub 630 could also communicate with a Local Area Network (not shown).

The wireless broadband router 625 connects with a Universal Serial Bus (USB) 616. The USB 616 connects with the PC 692, the USB hub 645, and the USB hub 650. The USB hub 645 connects with the PC 693 over a link 617. The link 617 is an Ethernet connection. The USB hub 650 connects with the PC 694 over a link 618. The link 618 is a wireless Ethernet connection. The wireless broadband router 625 connects with the voice system 655 over a link 619. The voice system 655 connects with the phone 660 over a link 621. The wireless broadband router 625 connects with the cable modem 665 over a link 622. The cable modem 665 connects with the TV 670 over a link 623. The link 623 is a coaxial cable. The cable box 680 connects with the link 611 and is configured to receive a wireless cable television feed. The cable box 680 connects with the TV 685 over a link 624. The link 624 is a coaxial cable.

The link 611 includes the splitter 675. The wireless broadband router 690 connects with the splitter 675 over a link 626. The link 626 is an RG-59 coaxial cable. The wireless broadband router 690 connects with the sector probe 695 over a link 627.

Those skilled in the art will appreciate that the transceiver 620, the cable box 680, the voice system 655, the cable modem 665, the USB hub 645, the USB hub 650, and the Ethernet hub 630 could be incorporated within the wireless broadband router 625.

The customer premises 600 operates as follows. The customer premises 600 communicates with the head end 500. To receive data from the head end 500, the directional antenna 635 receives an RF signal on the downstream channels over the link 129. The directional antenna 635 transfers the RF signal to the transverter 640. The transverter 640 processes the RF signal and converts the RF signal to an IF signal. The transverter 640 transmits the IF signal to the wireless broadband router 625 over the link 611. The wireless broadband router 625 processes the IF signal and converts the IF signal into packets containing the data. The wireless broadband router 625 transmits the packets to the Ethernet hub 630 over the link 612. Those skilled in the art will appreciate that the wireless broadband router 625 could transmit packets to the USB hub 645, the USB hub 650, the PC 692, the voice system 655, and the cable modem 665. The Ethernet hub 630 transmits the packets to the PC 691 over the link 614.

To transmit data to the head end 500, the PC 691 transmits packets, containing data, to the Ethernet hub 630 over the link 614. The Ethernet hub 630 transfers the packets to the wireless broadband router 625 over the link 612. The wireless broadband router 625 processes the packets and converts the data contained in the packets into an IF signal. Those skilled in the art will appreciate that the wireless broadband router 625 could also receive packets from the USB hub 645, the USB hub 650, the PC 692, the voice system 655, and the cable modem 665. The wireless broadband router 625 transfers the IF signal to the transverter 640 over the link 611. The transverter 640 processes the IF signal and converts the IF signal into an RF signal. The transverter 640 also amplifies the RF signal. The transverter 640 transmits the RF signal to the directional antenna 635. The directional antenna 635 transmits the RF signal to the head end 500 on the upstream channels over the link 128.

Figure 7:
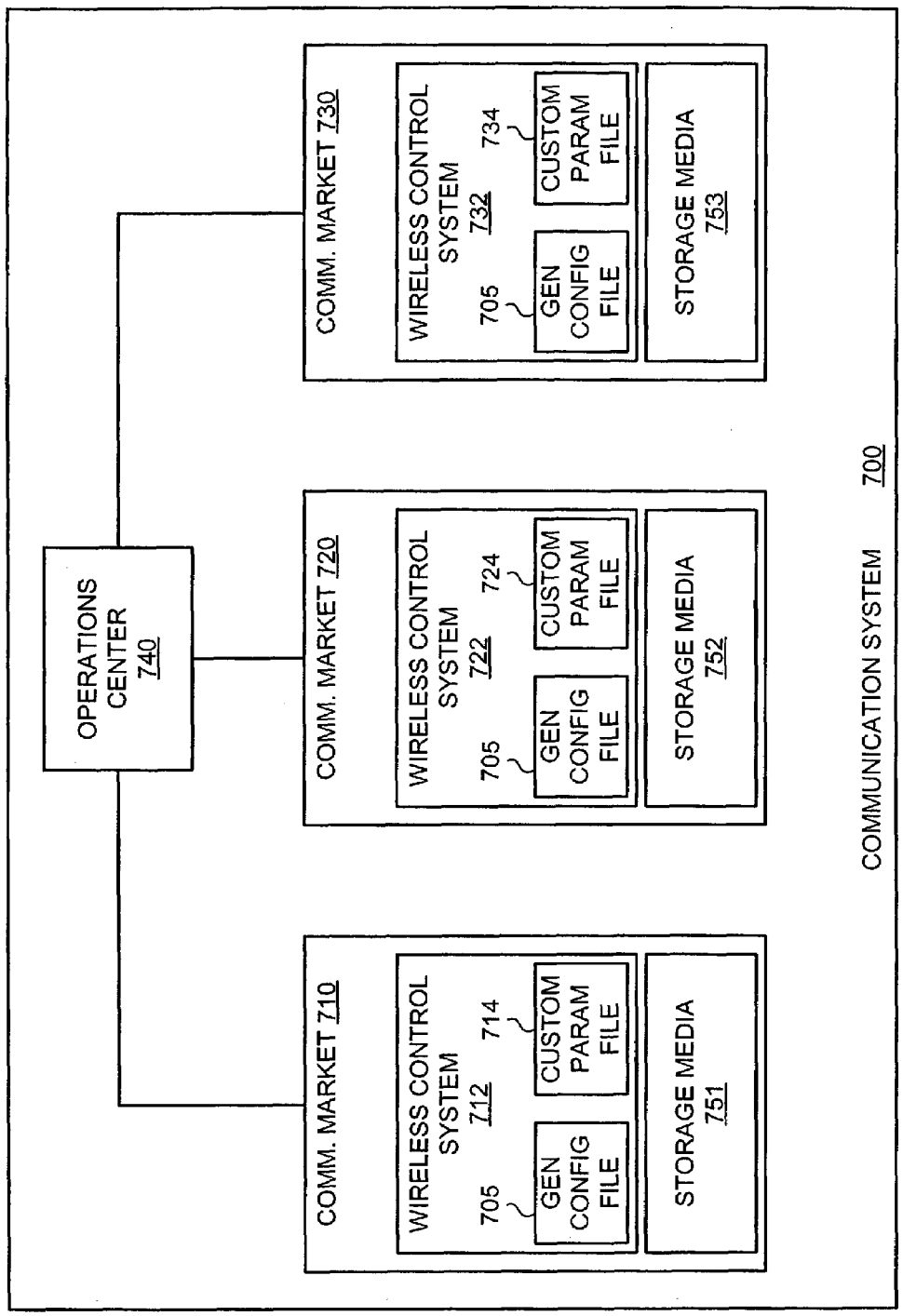
FIG. 7 is a block diagram of communication system in an example of the invention.
Figure 8:
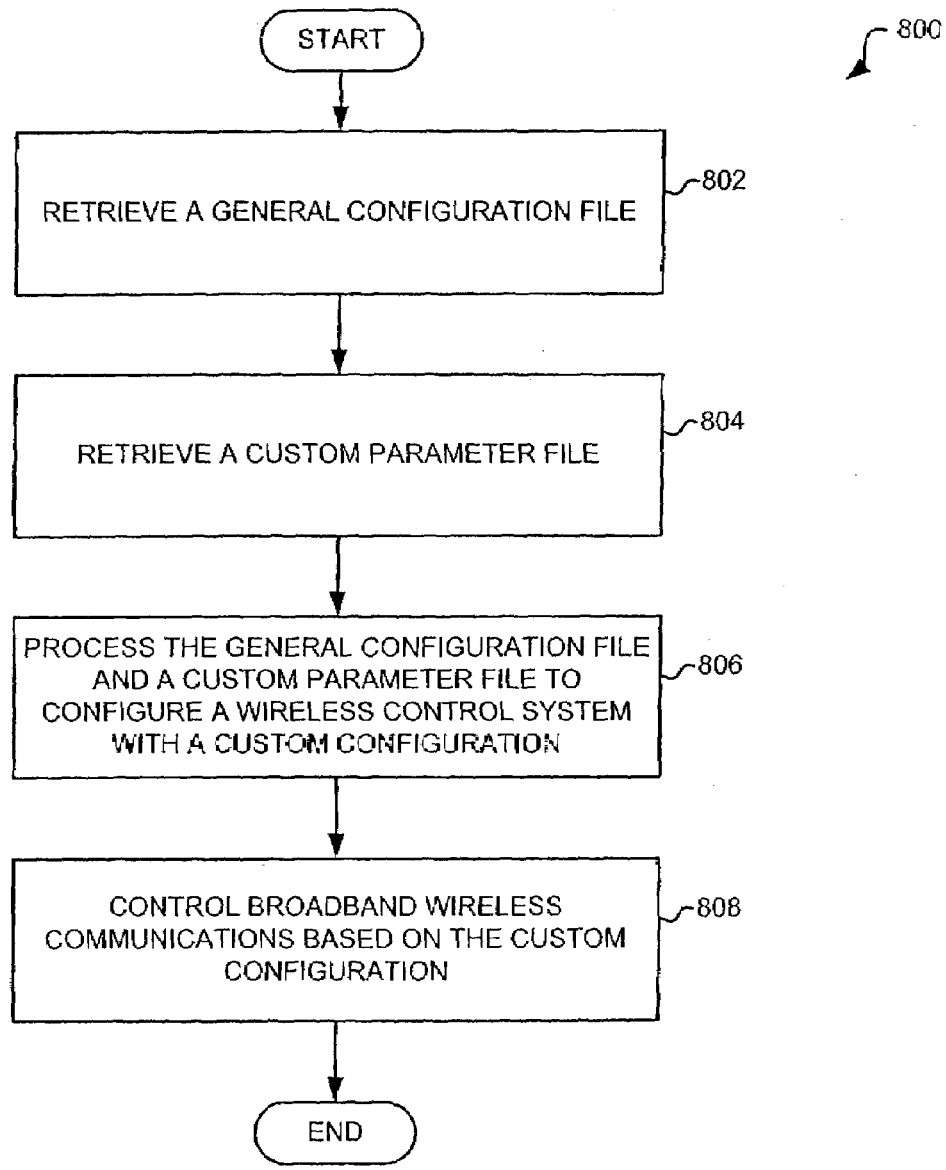
FIG. 8 is a flow diagram of process executed within the communication system in FIG. 7 to configure the wireless control systems in an example of the invention.

Communication System with Multiple Wireless Control Systems—FIGS. 7–8

FIGS. 7–8 disclose an embodiment of the invention, but the invention is not restricted to the configuration provided below. Those skilled in the art will appreciate numerous variations of this embodiment that are within the scope of the invention. Those skilled in the art will also appreciate how the principles illustrated in this embodiment can be used in other embodiments of the invention.

FIG. 7 depicts a block diagram of a communication system 700 in an example of the invention. Communication system 700 is comprised of a communication market 710, a communication market 720, and a communication market 730. Communication market 710 comprises a wireless control system 712 and a storage media 751. Communication market 720 comprises a wireless control system 722 and a storage media 752. Communication market 730 comprises a wireless control system 732 and a storage media 753.

A communication market is any collection of communication devices configured to communicate with each other. Examples of communication markets are cities such as Phoenix, Denver, Kansas City, etc. Each city forms one or more separate communication markets. An example of a communication device is a computer with a modem, such as PC 691 within customer premises 600 in FIG. 6. A wireless control system is any system configured to control or manage broadband wireless communications. One example of a wireless control system is market system manager 450 within market hub 400 in FIG. 4.

FIG. 8 depicts a flow diagram of a process 800 for configuring wireless control systems 712, 722, and 732 in communication system 700 in an example of the invention. In step 802, wireless control systems 712, 722, and 732 are configured to retrieve a general configuration file 705 (see FIG. 7). A general configuration file is any file that can be used by any or all of the wireless control systems to configure the wireless control systems. The general configuration file 705 may be common for all of the wireless control systems 712, 722, and 732. For example, the general configuration file 705 is a standard template.

In step 804, each of wireless control systems 712, 722, and 732 are configured to retrieve a custom parameter file 714, 724, and 734. A custom parameter file is any file that includes parameters for broadband wireless communications that are tailored for a specific geographic region. A geographic region could be a city, such as Kansas City, Mo.

In step 806, each of the wireless control systems 712, 722, and 732 are configured to process the general configuration file 705 and the custom parameter file 714, 724, and 734 to configure itself with a custom configuration. The custom configuration could be different for the wireless control systems 712, 722, and 732 or the same for the wireless control systems 712, 722, and 732 depending on the geographic region each of the wireless control systems 712, 722, and 732 are located. In step 808, each of the wireless control systems 712, 722, and 732 are configured to control broadband wireless communications based on the custom configuration. Broadband wireless communications comprise communications with a bandwidth equal to or above 64 kbps, such as Multichannel Multipoint Distribution Service (MMDS) communications.

Steps 802–806 may be automatically preformed upon the triggering of an event. For instance, a wireless control system 712, 722, and 732 may automatically perform steps 802–806 or other steps on power up. A wireless control system 712, 722, and 732 may automatically perform steps 802–806 or other steps upon another configuration command. A system administrator may manually enter a configuration command, and then a wireless control system 712, 722, and 732 automatically performs steps 802–806 or other steps.

In one embodiment of the invention, the general configuration file 705 is a script file executed by each of the wireless control systems 712, 722, and 732. The script file is in a text-based format. The custom parameter files 714, 724, and 734 include parameters for a particular market. The parameters may include city information, state information, frequency information, etc. Examples of city information are Signal-to-Noise Ratio (SNR), Forward Error Correction (FEC), upstream channel throughput, downstream channel throughput, number of customers per sector, etc. Frequency information may define a frequency band that can be used for a geographic region or for a specific location in a geographic region. The different frequency bands avoid interference from neighboring wireless communication systems.

Assume that wireless control system 712 controls a Denver market and wireless control system 722 controls a Kansas City market. The Denver market and the Kansas City market may have improved performance using different parameters. Both wireless control systems 712 and 722 can be configured using the general configuration file 705 even though different parameters are needed. The general configuration file 705 makes configuring multiple wireless control systems easier, more efficient, and more reliable. The configuration of wireless control systems 712 and 722 can then be customized for each market (geographic region) depending on the parameters entered in the custom parameter file 714 and 724.

In another embodiment, wireless control systems 712, 722, and 732 are configured to communicate with an operations center 740 (see FIG. 7). An operations center is any system configured to transmit a file to a wireless control system. One example of an operations center is national operations center 200 in FIGS. 1–2. Operations center 740 is configured to generate the general configuration file 705 and transfer the general configuration file 705 to wireless control systems 712, 722, and 732. Operations center 740 is also configured to generate a custom parameter file 714, 724, and 734 and transfer a custom parameter file 714, 724, and 734 to each of the wireless control systems 712, 722, and 732.

In another embodiment of the invention, wireless control systems 712, 722, and 732 are configured to communicate with storage media 751, 752, and 753 respectively, to retrieve the general configuration file 705 from storage media 751, 752, and 753. Those skilled in the art will understand that the storage media 751, 752, and 753 could be the same storage media used by each of the wireless control systems 712, 722, and 732. Each of the wireless control systems 712, 722, and 732 is also configured to retrieve a custom parameter file 714, 724, and 734 from storage media 751, 752, and 753, respectively. Examples of storage media 751, 752, and 753 are floppy disks, compact disks, or hard drives.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of configuring a plurality of wireless control systems for broadband wireless communications, the method comprising:
  in each individual one of the wireless control systems:
    retrieving a general configuration file, the general configuration file being common for the wireless control systems;
    retrieving a custom parameter file, the custom parameter file being customized for a geographic region;
    processing the general configuration file and the custom parameter file to configure the individual one of the wireless control systems with a custom configuration; and
    controlling the broadband wireless communications based on the custom configuration.

2. The method of claim 1 further comprising the steps of:
  generating the general configuration file; and
  transferring the general configuration file to the wireless control systems.

3. The method of claim 1 wherein the step of retrieving a general configuration file further comprises the step of:
  retrieving the general configuration file from a storage media.

4. The method of claim 1 wherein the general configuration file comprises a text-based script file.

5. The method of claim 1 further comprising the steps of:
  generating the custom parameter file; and
  transferring the custom parameter file to the individual one of the wireless control systems.

6. The method of claim 1 wherein the step of retrieving a custom parameter file further comprises the step of:
  retrieving the custom parameter file from a storage media.

7. The method of claim 1 wherein a parameter in the custom parameter file comprises city information.

8. The method of claim 1 wherein a parameter in the custom parameter file comprises state information.

9. The method of claim 1 wherein a parameter in the custom parameter file comprises frequency information for the broadband wireless communications.

10. The method of claim 1 wherein the broadband wireless communications comprise Multichannel Multipoint Distribution Service (MMDS) communications.

11. A communication system for broadband wireless communications, the communication system comprising:
  a plurality of wireless control systems wherein each individual one of the wireless control systems is configured to:

retrieve a general configuration file, the general configuration file being common for the wireless control systems;

retrieve a custom parameter file, the custom parameter file being customized for a geographic region;

process the general configuration file and the custom parameter file to configure the individual one of the wireless control systems with a custom configuration; and control the broadband wireless communications based on the custom configuration.

12. The communication system of claim 11 further comprising:

an operations system configured to generate the general configuration file and transfer the general configuration file to the wireless control systems.

13. The communication system of claim 11 wherein each individual one of the wireless control systems is further configured to:

retrieve the general configuration file from a storage media.

14. The communication system of claim 11 wherein the general configuration file comprises a text-based script file.

15. The communication system of claim 11 further comprising:

an operations systems configured to generate the custom parameter file and transfer the custom parameter file to the individual one of the wireless control systems.

16. The communication system of claim 11 wherein each individual one of the wireless control systems is further configured to:

retrieve the custom parameter file from a storage media.

17. The communication system of claim 11 wherein a parameter in the custom parameter file comprises city information.

18. The communication system of claim 11 wherein a parameter in the custom parameter file comprises state information.

19. The communication system of claim 11 wherein a parameter in the custom parameter file comprises frequency information for the broadband wireless communications.

20. The communication system of claim 11 wherein the broadband wireless communications comprise Multichannel Multipoint Distribution Service (MMDS) communications.

* * * * *